United States Patent
Wilcoxon et al.

(10) Patent No.: US 7,235,190 B1
(45) Date of Patent: Jun. 26, 2007

(54) NANOCLUSTER-BASED WHITE-LIGHT-EMITTING MATERIAL EMPLOYING SURFACE TUNING

(75) Inventors: Jess P. Wilcoxon, Albuquerque, NM (US); Billie L. Abrams, Albuquerque, NM (US); Steven G. Thoma, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 350 days.

(21) Appl. No.: 10/933,069

(22) Filed: Sep. 2, 2004

(51) Int. Cl.
*C09K 11/56* (2006.01)
*C09K 11/54* (2006.01)

(52) U.S. Cl. .............. 252/301.6 S; 423/566.1; 977/773; 977/824; 977/834

(58) Field of Classification Search ......... 252/301.6 S, 252/301.35
See application file for complete search history.

(56) References Cited

U.S. PATENT DOCUMENTS

| | | |
|---|---|---|
| 5,147,841 A | 9/1992 | Wilcoxon |
| 5,455,489 A | 10/1995 | Bhargava et al. |
| 5,882,779 A | 3/1999 | Lawandy |
| 5,985,173 A | 11/1999 | Gray et al. |
| 6,048,616 A | 4/2000 | Gallagher et al. |
| 6,090,200 A | 7/2000 | Gray et al. |
| 6,241,819 B1 | 6/2001 | Bhargava et al. |
| 6,379,583 B1 | 4/2002 | Gray et al. |
| 6,423,551 B1 * | 7/2002 | Weiss et al. ............. 436/518 |
| 6,447,698 B1 | 9/2002 | Ihara et al. |
| 6,501,091 B1 | 12/2002 | Bawendi et al. |
| 6,600,175 B1 | 7/2003 | Baretz et al. |
| 6,660,379 B1 | 12/2003 | Lakowicz et al. |
| 2004/0072428 A1 * | 4/2004 | Sato et al. ............... 438/689 |
| 2004/0245912 A1 | 12/2004 | Thurk et al. |

OTHER PUBLICATIONS

Zhiyong Zhou, Louis Brus, and Richard Friesner, "Electronic Structure and Luminescence of 1.1- and 1.4-nm Silicon Nanocrystals: Oxide Shell versus Hydrogen Passivation" Nano Letters, 2003, vol. 3. No. 2. pp. 163-167.
Seth Coe-Sullivan, Wing-Keung Woo, Jonathan S. Steckel, Moungi Bawendi and Vladimir Bulovic, "Tuning the performance of hybrid organic/inorganic quantum dot light-emitting devices", Organic Electronics 4 (2003) pp. 123-130.
B. O. Dabbousi, et al "(CdSe)ZnS Core-Shell Quantum Dots: Synthesis and Characterization of a Size Series of Highly Luminescent Nanocrystallites", American Chemical Society, 1997, vol. 101, No. 46, pp. 9463-9475.
S. Guha, et al, "Hybrid Organic-Inorganic semiconductor-based light-emitting diodes", J. Appl. Phys. Oct. 1997 vol. 82 No. 8, pp. 4126-4128.
Karuna K. Nanda, et al, "Energy Levels in Embedded Semiconductor Nanoparticles and Nanowires" Nano Letters, 2001, vol. 1, No. 11, pp. 605-611.

(Continued)

*Primary Examiner*—C. Melissa Koslow
(74) *Attorney, Agent, or Firm*—Carol I. Ashby

(57) ABSTRACT

A method for making a nanocrystal-based material capable of emitting light over a sufficiently broad spectral range to appear white. Surface-modifying ligands are used to shift and broaden the emission of semiconductor nanocrystals to produce nanoparticle-based materials that emit white light.

32 Claims, 10 Drawing Sheets

OTHER PUBLICATIONS

Jinwook Lee, et al, "Full Color Emission from II-VI Semiconductor Quantum Dot-Polymer Composites", Advanced Materials, 2000, vol. 12, No. 15, pp. 1102-1105.

C. B. Murray, et al, "Synthesis and Characterization of Nearly Monodisperse CdE (E = S, Se, Te) Semiconductor Nanocrystallites", Journal of American Chemical Society, 1993, vol. 115, No. 19, pp. 8706-8715.

Dmitri V. Talapin, et al, Highly Luminescent Monodisperse CdSe and CdSe/ZnS Nanocrystals Synthesized in a Hexadecylamine-Trioctylphosphine Oxide—Trictylphospine Mixture, Nano Letters, 2001, vol. 1, No. 4 pp. 207-211.

P.Lianos et al, "Cadmium Sulfide of Small Dimensions Produced in Inverted Micelles" Chemical Physics Letters, 1986, vol. 125. No. 3. pp. 299-302.

Barbara A. Harruff et al, "Spectral Properties of AOT-Protected CdS Nanoparticles: Quantum Yield Enhancement of Photolysis", Langmuir 2003, vol. 19, No. 3 pp. 893-897.

Jun Zhang et al, "Size control and photoluminescense", Solid State Communications., 2003, vol. 124, pp. 45-48.

Lubomir Spanhel et al, "Photochemistry of Colloidal Semiconductors. 20. Surface Modification and Stability of Strong Luminescing CdS Particles", J. Am. Chem. Soc. 1987, vol. 109, No. 19, pp. 5649-5655.

U. Resch et al, "Absorption and Fluorescence Behavior of Redispersible CdS Colloids in Various Organic Solvents," Langmuir, 1992, vol. 8, No. 9 pp. 2215-2218.

* cited by examiner

NANOCLUSTER-BASED WHITE-LIGHT-EMITTING MATERIAL EMPLOYING SURFACE TUNING

The United States Government has rights in this invention pursuant to Department of Energy Contract No. DE-AC04-94AL85000 with Sandia Corporation.

BACKGROUND OF THE INVENTION

This invention relates to a method for making a nanocrystal-based material capable of emitting light at a sufficiently wide range of wavelengths to appear white, making it suitable as a phosphor for visible illumination. Lamp phosphors for visible illumination are typically designed to be strongly absorbing at the energy corresponding to the Hg discharge lines of current fluorescence light tubes, around 254 nm. The "wall-plug" efficiency of fluorescent lighting is very good, about 28%. However, the desire to eliminate the toxic Hg in such sources and replace it with materials such as the inert gas Xe requires the development of new phosphors with longer wavelength absorbance, ~400 nm. Additionally, the color rendering of current lighting could be improved as the dominance of less efficient incandescent lighting over fluorescent lighting in residential applications demonstrates.

Alternative excitation sources, such as near-UV solid state GaN LEDs, also require new phosphors with strong absorbance near 400 nm. Unfortunately, phosphors that emit broadly in the visible range of 450-650 nm with little or no self-absorbance or scattering do not exist. Since either scattering or self-absorption in a conventional phosphor leads to loss of light extraction and overall efficiency in a lighting device, new types of phosphors are needed Phosphors based upon semiconductor nanocrystals, often termed nanophosphors, have certain desirable properties for both lamp and LED applications. In the latter application, in particular, the ability to determine the absorption characteristics by both nanocrystal size and material type should allow one to make a material with a large absorption in the 380-420 nm regime, optical transparency in the visible regime, and negligible scattering in the visible region.

All semiconductor nanocrystals made simply by high-temperature decomposition of organometallic precursors result in phosphors with strong overlap between absorbance and photoluminescence, (PL), as well as narrow-linewidth PL emission. These two characteristics mean that blending of various sizes of nanocrystals is required to achieve a broad, white emission. The resulting blend will not be optically transparent to visible light. Thus, the smallest nanocrystals with the shortest emission wavelength need to be closest to the excitation source so that their PL can be used to excite the other larger nanocrystals emitting at longer wavelengths. Each absorption/emission event lowers the overall efficiency. The nanophosphor layering must also occur at large optical densities to ensure that all the exciting light is captured in the short distances of 1-3 mm available in most LED geometries.

To eliminate the need to mix and layer different size nanocrystals to produce white light, an ideal nanophosphor should have independently adjustable absorbance and emission energies. This is achieved in conventional lamp phosphors by the choice of the absorbing semiconductor matrix material and suitable luminescent ions (termed dopants, activators, or luminescent centers). If a nanocrystal is sufficiently small that carrier recombination occurs almost completely from surface states or interface states, a similar decoupling of absorption energy from emission energy is possible. For example, in nanocrystalline Si, the photogenerated carriers in small, 1-3 nm clusters, have been calculated to rapidly diffuse to the surface where they are believed to be trapped in a wide energy range of "sub-gap" interface states from which recombination and light emission may occur (Zhou et al., Nano Letters 3 (2003) p. 163-167.)

A number of patents exist concerning light-emitting nanocrystals.

Gray et al. (U.S. Pat. No. 5,985,173) concerns phosphors having a high light output level, no or few surface defects, and exhibiting minimal non-radiative recombination. These objects are accomplished by surrounding a doped host with a shell having a band gap either larger than the bandgap of the doped host or having no states within 20 meV to 200 meV of said band edges, or having a bandgap offset from said bandgap of the doped host such that an electron or hole from the doped host material is reflected back into the doped host material.

Gray et al. (U.S. Pat. No. 6,090,200) concerns the method for making the phosphors claimed in U.S. Pat. No. 5,985,173.

Gray et al. (U.S. Pat. No. 6,379,583) concerns nanocrystalline phosphors comprising a semiconductor host compound doped with one or more of several dopant atoms wherein said doped nanocrystalline phosphor has an average of about one or less dopant ions per nanocrystalline phosphor particle.

Gallagher and Bhargava (U.S. Pat. No. 6,048,616) concerns doped encapsulated semiconductor nanoparticles of a size (<100 Angstroms) which exhibit quantum confinement effects. The nanoparticles are precipitated and coated with a surfactant by precipitation in an organometallic reaction. The luminescence of the particles may be increased by a further UV curing step.

Bhargava (U.S. Pat. No. 5,455,489) concerns displays comprising doped nanocrystal phosphors. The phosphor material used in the displays comprises doped nanocrystals: tiny, separated particles of the order of 100 Angstroms or less and thus exhibiting quantum confinement properties. These quantum-confined particles of certain luminescent materials when doped with an activator yield ultra-fast and efficient phosphors.

Bhargava and Gallagher (U.S. Pat. No. 6,241,819) concerns a method of making doped semiconductor nanocrystals. The method involves first making a polymer matrix containing dopant and one component of the host material, drying the matrix, immersing polymer matrix in second solution, diffusing in second component to react and grow doped nanocrystals within the polymer matrix, removing the polymer matrix from the second solvent, and drying the matrix.

Ihara et al. (U.S. Pat. No. 6,447,696) reports a manufacturing method for a nanocrystal light emission substance having a nanostructure crystal, doped with an activator and cured with ultraviolet light. The nanocrystal light emission substance is synthesized by a liquid phase co-precipitation process. During the liquid phase reaction, an organic acid, such as acrylic acid or methacrylic acid, is added. Alternatively, a high molecular organic acid, such as polyacrylic or polymethacrylic acid, polystyrene, is added after the liquid phase reaction. The resulting substance is then cured with ultraviolet light.

The preceding patents incorporate dopants, also called activators or luminescent centers, within the nanocrystal to achieve light emission at a wavelength determined by the electronic properties of the dopant in the nanocrystal.

Lawandy (U.S. Pat. No. 5,882,779) reports a display screen comprising a class of high efficiency (e.g. >20%) materials for use as display pixels. The materials are comprised of nanocrystals such as CdSSe, CuCl, GaN, CdTeS, ZnTe, ZnSe, ZnS, or porous Si or Ge alloys which may or may not contain a luminescent center. The nanocrystals may be doped with a luminescent center such as $Mn^{2+}$ or a transition metal. The nanocrystals have passivated surfaces to provide high quantum efficiency. The nanocrystals have all dimensions comparable to the exciton radius (e.g., a size in the range of approximately 1 nm to approximately 10 nm). A quantum dot nanocrystal display phosphor has a size selected for shifting an emission wavelength of a constituent semiconductor material from a characteristic wavelength observed in the bulk to a different wavelength.

Lakowicz et al. (U.S. Pat. No. 6,660,379) reports CdS nanoparticles formed in the presence of an amine-terminated dendrimer that show blue emission and the method for making these nanoparticles. The emission wavelength of these nanoparticles depends on the excitation wavelength. The CdS/dendrimer nanoparticles display polarized emission with the anisotropy rising progressively from 340 to 420 nm excitation, reaching a maximal anisotropy value in excess of 0.3. Polyphosphate-stabilized CdS nanoparticles are described that display a longer wavelength red emission maximum than bulk CdS and display a zero anisotropy for all excitation wavelengths.

SUMMARY OF THE INVENTION

This invention comprises a method for making a nanocrystal-based material capable of emitting light over a sufficiently broad spectral range to appear white.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate concepts and embodiments of the present invention and, together with the description, serve to explain the principles of the invention.

DETAILED DESCRIPTION OF THE INVENTION

This invention comprises a method for making a nanocrystal-based material capable of emitting light over a sufficiently broad spectral range to appear white. This is accomplished by modifying the surface of a semiconductor nanocrystal after it is synthesized. To improve performance, the surface-modified semiconductor nanocrystal, or nanoparticle, can undergo surface reconstruction over time to increase the number of wavelengths at which emission occurs. The terms nanocrystal and nanocluster are both employed to describe crystalline nanoparticles that are less than 20 nm in critical dimension, where the critical dimension for a spheroidal nanocrystal is essentially the nanocrystal diameter, d. Nanocrystals of nonspheroidal shape but with the largest dimension less than 20 nm satisfy this condition as well. Nanocrystals of this dimensional range exhibit strong quantum confinement behavior when they are composed of materials whose exciton confinement or Bohr radius, $r_B$ is such that, $r_B > d$, and are often referred to as "quantum dots." The term nanoparticle is used herein to refer to a nanocrystal or nanocluster that has surface-bound ligands that determine the interfacial chemistry and the surface electronic states of the nanoparticle. The resulting nanocrystal with its bound surface-modifying compounds forms a surface-dominated light-emitting nanoparticle. The use of bound surface-modifying compounds to control emission spectra is termed surface tuning.

A key feature of this invention is the use of a single size of nanocrystal, or a narrow range of nanocrystal sizes, to produce an ensemble of light-emitting nanoparticles whose emission spectra span a sufficiently wide range of wavelengths to provide white light. The color of the emitted light is controlled by the interfacial chemistry and age-dependent surface reconstruction of the semiconductor nanocrystals rather than being dominated by the excitonic transition energies of the semiconductor nanocrystals that are determined by the quantum confinement of electronic carriers due to the small nanocrystal size.

It is possible to tune the wavelength of maximum absorption and emission of single-sized nanocrystals throughout the visible range by changing the nanoparticle size and surface composition. Using this invention, the wavelength of maximum emission can be independently shifted away from the wavelength of maximum absorption, which is a way to decrease self-absorbance and increase light emission extraction at high cluster concentrations or optical density. When a distribution of nanocrystal sizes is employed, the size distribution can be sufficiently narrow that the range of wavelengths derived from emission at the quantum-confined excitonic emission energies is not dominant in determining the output spectral energy distribution.

Figure 1:
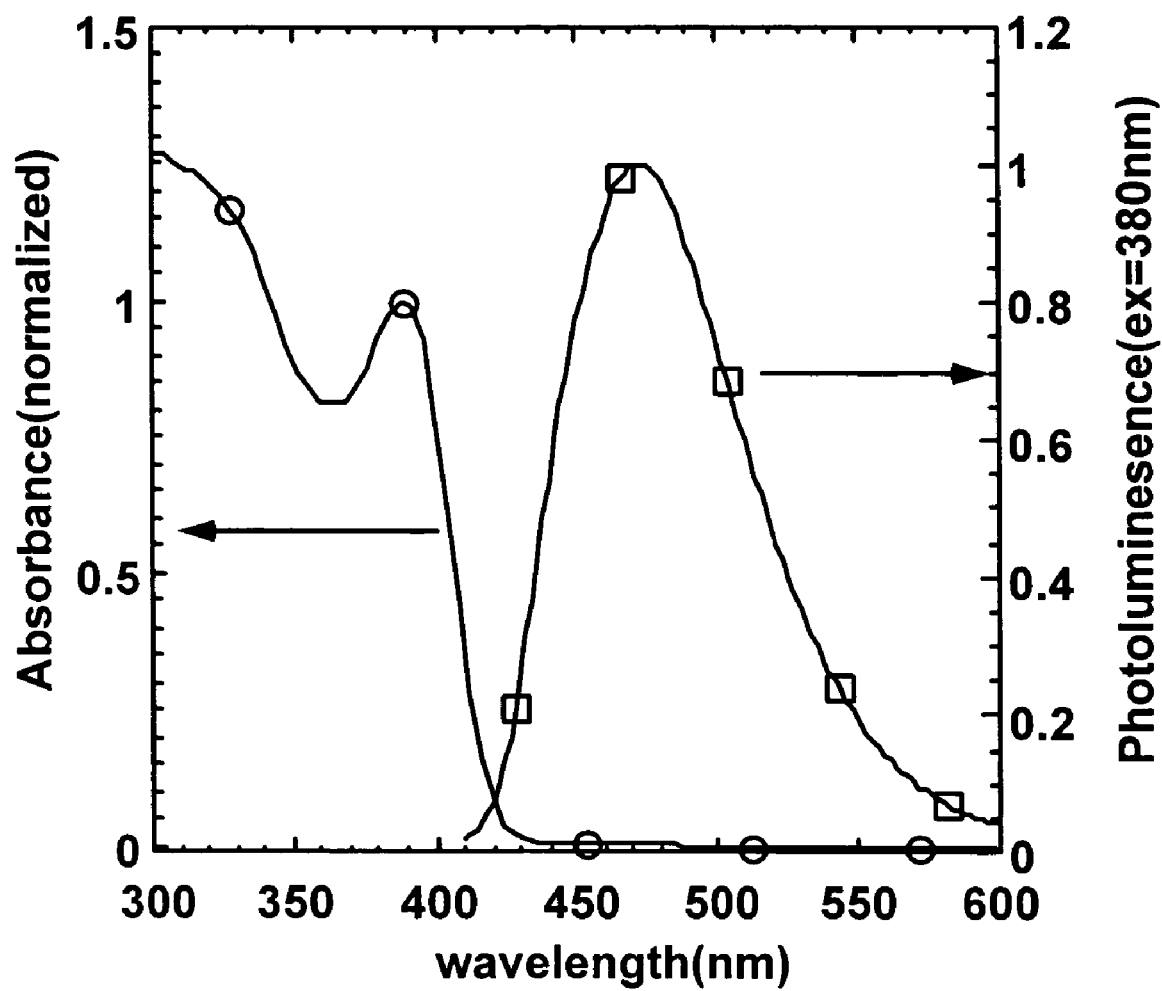
FIG. 1 illustrates the visible transparency (absorbance curve, open circles) and blue photoluminescence (open squares, normalized to the maximum photoluminescence emission wavelength) from freshly prepared d=2 nm CdS clusters in octane, stabilized using AOT, before surface modification and aging to produce white luminescence.

Small nanocrystals that have their absorption maximum in the near ultraviolet range are especially useful for this application because the wavelength shift of their emission into the visible range by surface tuning avoids the problem of reduced quantum efficiency due to self-absorbance of emitted light, such as occurs when the absorption and emission spectra are highly overlapping in wavelength under conditions where the peak emission wavelength is primarily controlled by the nanocrystal critical dimension. This is illustrated in FIG. 1, where the absorption spectrum and the emission spectrum, also referred to as the spectral energy distribution, for 2.0-nm CdS nanocrystals surface-tuned by reaction with an alkyl thiol are shown. However, it is not essential to this invention that the overlap of the absorption and emission spectra be totally minimized; use of nanocrystals with substantial overlap between the nanocrystal absorption spectrum and the surface-tuned emission spectrum is included in the scope of this invention. An additional advantage of this invention is the retention of white-light emission when the surface-tuned nanocrystals are incorporated in an encapsulant.

In some embodiments of this invention, the nanocrystals are initially made using the inverse micelle method described in Wilcoxon, U.S. Pat. No. 5,147,841, which is incorporated herein by reference. An example of this method of forming nanocrystals of CdS with cross-sectional diameters in the range of 1-3 nm follows. A nitrogen-purged inverse-micelle solution of the anionic surfactant bis(2-ethylhexyl) sulfosuccinate sodium salt, $(C_{20}H_{37}NaO_7S)$, also called Aerosol-OT or AOT, is dissolved in a saturated alkyl hydrocarbon, $C_kH_{(2k+2)}$, where k=6–16, (hexane, octane, decane, dodecane, tetradecane, hexadecane) to form a clear inverse micelle solution. In various embodiments, suitable solvents include alkanes, aromatic hydrocarbons, ethers, cyclic ethers, tetrahydrofuran, and alcohols containing at least 8 carbon atoms. Other surfactants suitable for this method include quaternary ammonium salts comprising alkyl chains containing 16 or more carbon atoms, and alkylated polyethers of the formula $CH_3(CH_2)_m(CH_2CH_2O)_nOH$ where m is at least 8 and n is at least 4. A Cd salt, where the anion is either nitrate, chloride, iodide, or perchlorate, is then directly dissolved in the AOT inverse micelle by vigorous stirring to form a solution that is nonscattering at visible wavelengths. A second nitrogen-purged solution of a sulfide source, such as $(NH_4)_2S$, $H_2S$, $Li_2S$, and $Na_2S$, is prepared by dissolving a 3M solution of the sulfide in water into an AOT inverse micelle solution using vigorous stirring or by vortex mixing or sonication. The two solutions are poured together rapidly while stirring. Alternatively, the two precursor solutions are injected into a reaction chamber using two programmable syringes. A typical injection rate is 10 ml/hr, but other rates can be employed.

Increasing the precursor salt concentration provides more material for the growth process and results in larger clusters. Both the absorbance edge and the photoluminescence (PL) peak emission energy are shifted to longer wavelengths (red-shifted) with increasing nanocluster size. For the purpose of achieving broad, surface-tunable PL energies and widths without appreciable emission in the visible from the excitonic levels of the nanocrystal, a Cd concentration between 0.002M and 0.004M, which results in clusters with an average size of 1.8-2.5 nm, works well. Other concentrations may also be used. Such clusters have an absorbance onset near 420 nm and a first absorbance peak near 380 nm as shown in FIG. 1. They have broad blue emission whose maximum is near 470-480 nm as shown in FIG. 1. The large Stokes shift between absorbance and emission enables these high surface area clusters to have minimal self-absorbance, thereby increasing quantum efficiency, and these cluster solutions are transparent to visible light even at high concentrations (e.g. 0.01M).

In other embodiments, the nanocrystals may be formed by techniques other than the inverse micelle method. Nanocrystals that have been preformed by a different technique can be dissolved in a solvent for use in this invention. These techniques are well known in the art. The solvents suitable for use in this embodiment include alkyl hydrocarbons, aromatic hydrocarbons, and alcohols containing 8 or more carbon atoms. The surfactants suitable for use in this embodiment include AOT quatenary ammonium salts comprising alkyl chains containing at least 16 carbon atoms, and alkylated polyethers of the formula $CH_3(CH_2)_m(CH_2CH_2O)_nOH$ where m is at least 8 and n is at least 4.

Figure 2:
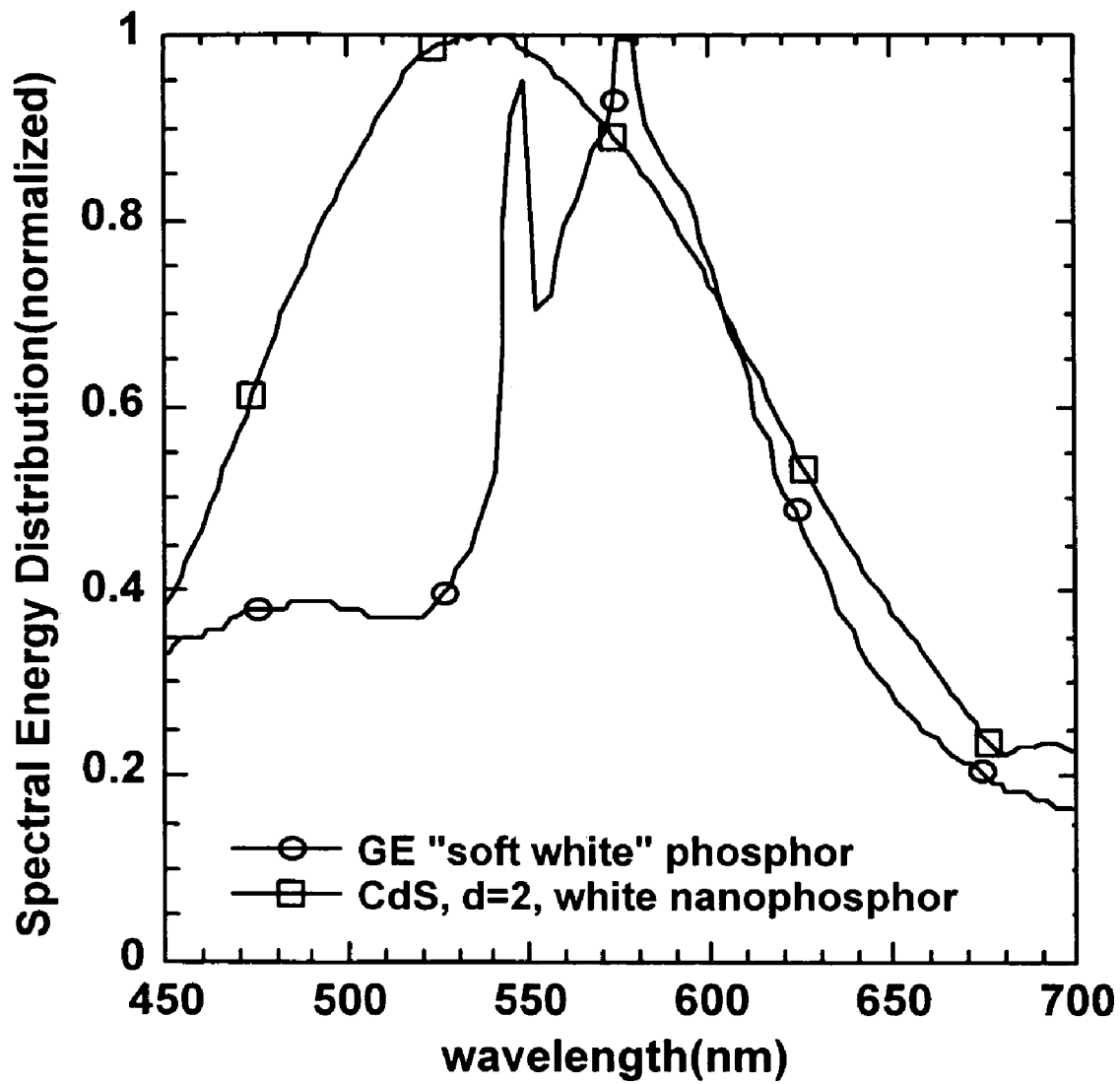
FIG. 2 illustrates the spectral energy distribution as a function of wavelength for thiol-surface-modified, aged, white-light-emitting CdS nanoparticles of 2.0-nm diameter excited using 380-nm light. The curve with open squares is the emission from the CdS nanoparticles. For comparison, the curve with open circles illustrates the emission from a General Electric "soft white" phosphor excited using 254-nm light.
Figure 3:
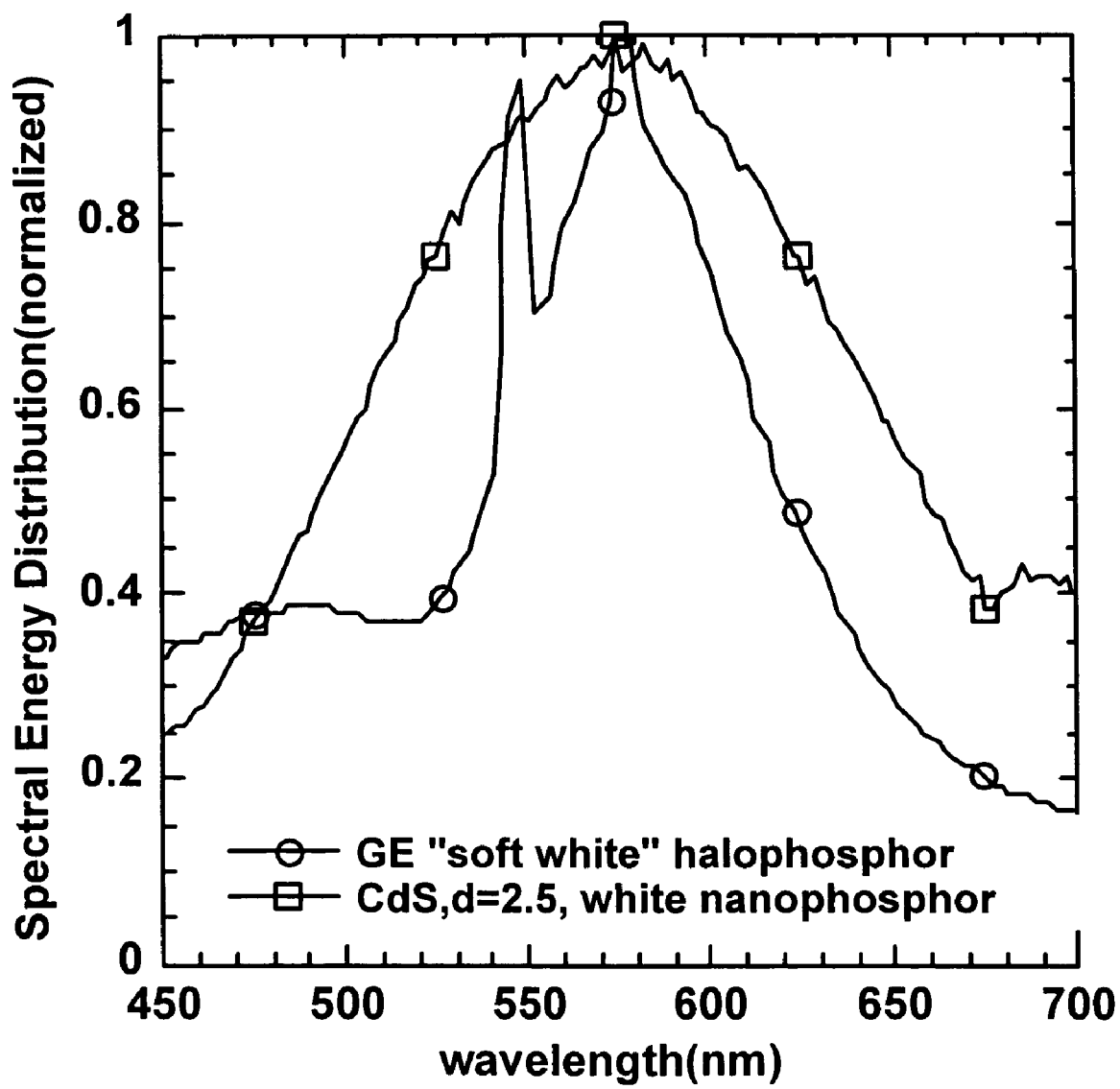
FIG. 3 illustrates the spectral energy distribution as a function of wavelength for thiol-surface-modified, aged, white-light-emitting CdS nanoparticles of 2.5-nm diameter excited using 380-nm light. The curve with open squares is the emission from the CdS nanoparticles. For comparison, the curve with open circles illustrates the emission from a General Electric "soft white" phosphor excited using 254-nm light.

Since the specific size of the nanocrystal is not the dominant factor in controlling the spectral distribution of light emission, the color temperature of the white light that is emitted by the surface-tuned nanocrystals can be adjusted by selection of the size of the nanocrystal. FIGS. 2 and 3 illustrate the emission spectrum obtained with surface-tuned nanocrystals with critical dimensions of 2.0 and 2.5 nm. Their spectral energy distributions are compared with that from a commercial General Electric "soft white" phosphor. Hexadecanethiol is the surface modifying ligand employed in these examples. The peak emission wavelength from the smaller nanocrystal is slightly blue shifted relative to the emission peak from the larger nanocrystal. This permits the formation of light-emitting material that is either "warmer" (more reddish) or "cooler" (more bluish), as may be desired for a particular illumination situation.

Figure 4:
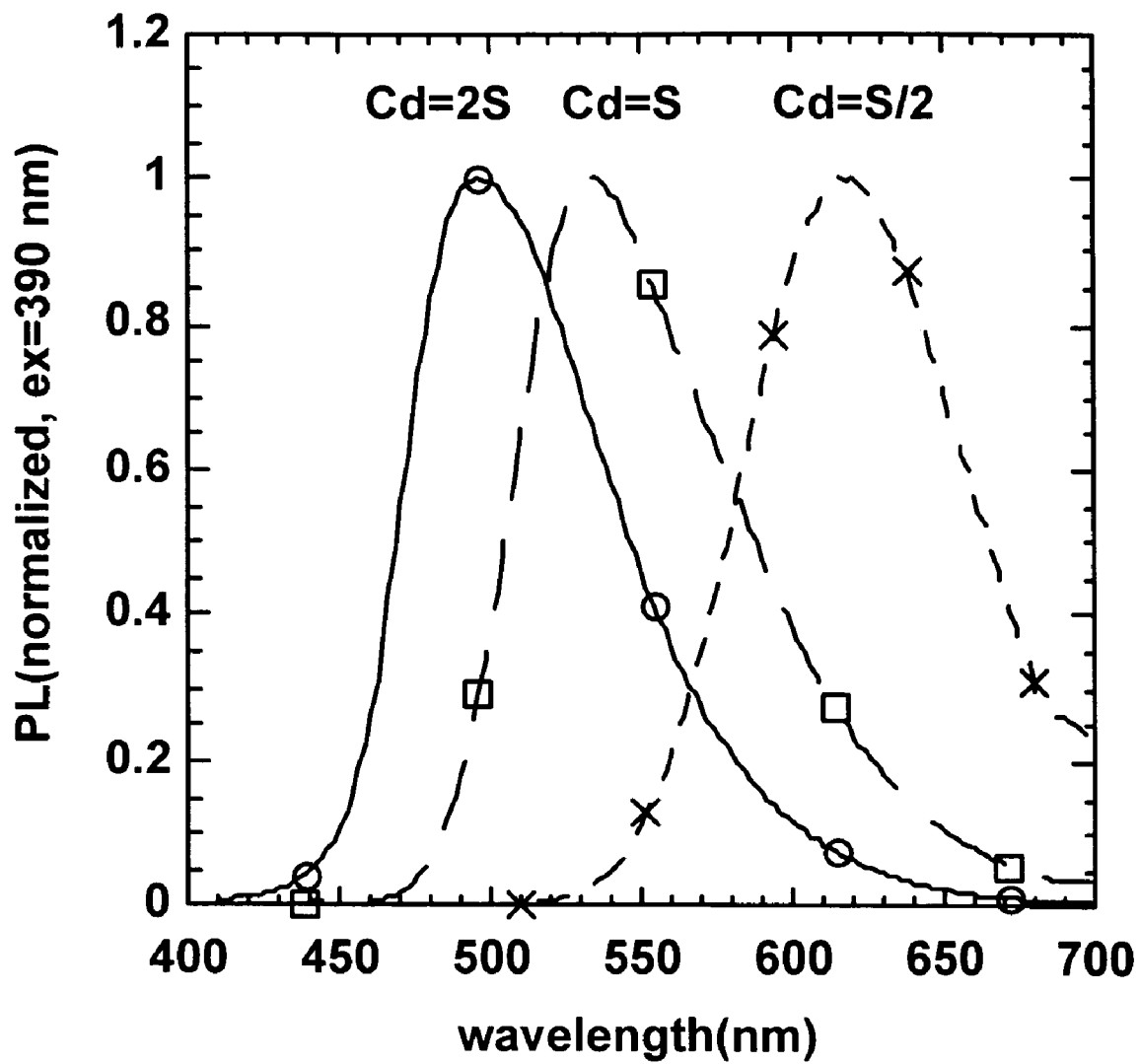
FIG. 4 illustrates the effect of Cd:S ratio on the color of 2.5-nm CdS nanocrystals stabilized by the surfactant AOT. Excess electron traps produced by excess Cd yield blue emission, (open circles), while hole traps produced by excess S yield red emission, (crosses). Green emission occurs for Cd=S, (open squares).

The Cd:S ratio during the reaction to form the nanocrystals can influence subsequent surface modification and restructuring to produce the wide range of PL energies that produce broadband or white light. The surface-modifying ligands are generally electron-donating ligands such as alkyl thiols, phosphines, and amines, so their binding is facilitated by using a Cd:S ratio with Cd>S; typical values are Cd:S of 1.0 to 2.0. However, other Cd:S ratios can also be employed. FIG. 4 shows that distinct colors are produced in the cluster solution depending on the Cd:S ratio. This is due to the formation of either electron traps with excess Cd(II), which blue-shifts the emission relative to the stoichiometric sample, or hole traps with excess S(II), which red-shifts the emission. The highest PL intensities for freshly prepared CdS nanocrystals tend to result with a Cd:S ratio of 1. The CdS nanocrystal wavelength of maximum initial emission occurs at higher energy for Cd:S<1 and lower energy for Cd:S<1 when prepared in octane and stabilized with AOT (FIG. 4). After reaction with the surface-modifying ligands, the nanocrystals made with these different Cd:S ratios all develop broad PL, becoming good broadband or white-light emitters.

After formation of semiconductor nanocrystals of a suitable size has been achieved, they are reacted in solution with a surface-modifying ligand. Two general approaches to this step of the method are included as embodiments of the invention. In one, the surface-modifying ligand is added to the reaction solution in which the semiconductor nanocrystals formed. This is done after waiting a sufficient time for the reaction forming the nanocrystals to proceed substantially to completion. The other embodiment involves isolation of the nanocrystals from the original reaction solution, redissolution in a suitable solvent, and addition of the surface-modifying ligand to the new solution. The term solution is employed to include both true solutions and suspensions of particles. The term dissolution is employed to include both dissolution and suspension. The term redissolution is employed to include both redissolution and resuspension.

Figure 5:
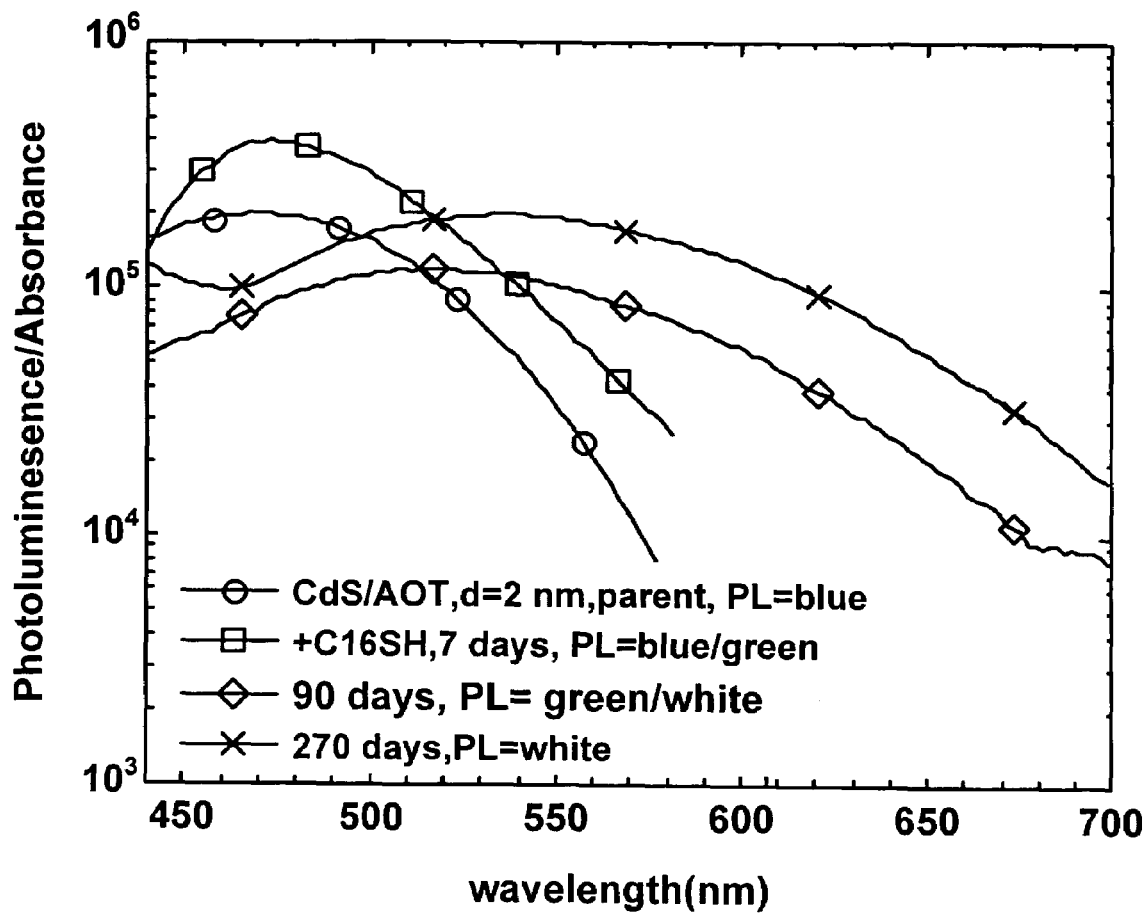
FIG. 5 illustrates the aging of thiol-modified CdS nanocrystals at room temperature. Ambient temperature aging, T=22° C., of 2-nm CdS nanoparticles was performed following binding of hexadecanethiol, C16SH, to the nanocluster surface. The initially blue emitting clusters, illustrated in FIG. 1, increase in total emitted energy and broaden in emitted wavelength range with increasing aging time until white emission is obtained. Open circles designate the blue-light-emitting nanoclusters as initially formed (parent nanoclusters). Open squares designate the blue-green-emitting nanoparticles 7 days after initial binding to the thiol. Open diamonds designate the green-white-emitting nanoparticles 90 days after initial binding to the thiol. Crosses designate the white-emitting nanoparticles 270 days after initial binding to the thiol.

The temporal evolution of the spectral energy distribution for surface-modified nanoparticles made in accordance with the first of these approaches is shown in FIG. 5. The 2-nm CdS nanoclusters stabilized in AOT with initial [CdS]=0.002M were allowed to undergo surface restructuring in the absence of thiol for 1 day. Shorter surface restructuring times can be employed if the restructuring time is sufficient for the surface restructuring to proceed substantially to completion. The emission from this "parent" nanocrystal was blue, with the PL peak centered at approximately 470 to 480 nm. An alkyl thiol, in this case hexadecanethiol, was added to the hydrocarbon solution containing the clusters, resulting in a final thiol concentration of 0.002M. A color shift and broadening of the PL was observed within 7 days, as shown in FIG. 5. The emission spectrum of the sample continued to change with time, with its peak emission wavelength red-shifting to approximately 530 nm and the emission linewidth broadening to produce white emission. FIG. 2 provides a comparison of the spectral energy distribution of a dilute solution of these nanophosphors with a commercial GE soft-white phosphor. The "warm" nanophosphor illustrated in FIG. 3 was made by the same method except for starting with CdS nanocrystals with a diameter of 2.5 nm and a "parent" peak PL emission wavelength of approximately 510 to 520 nm and employing a final thiol concentration of 0.004M.

Figure 6:
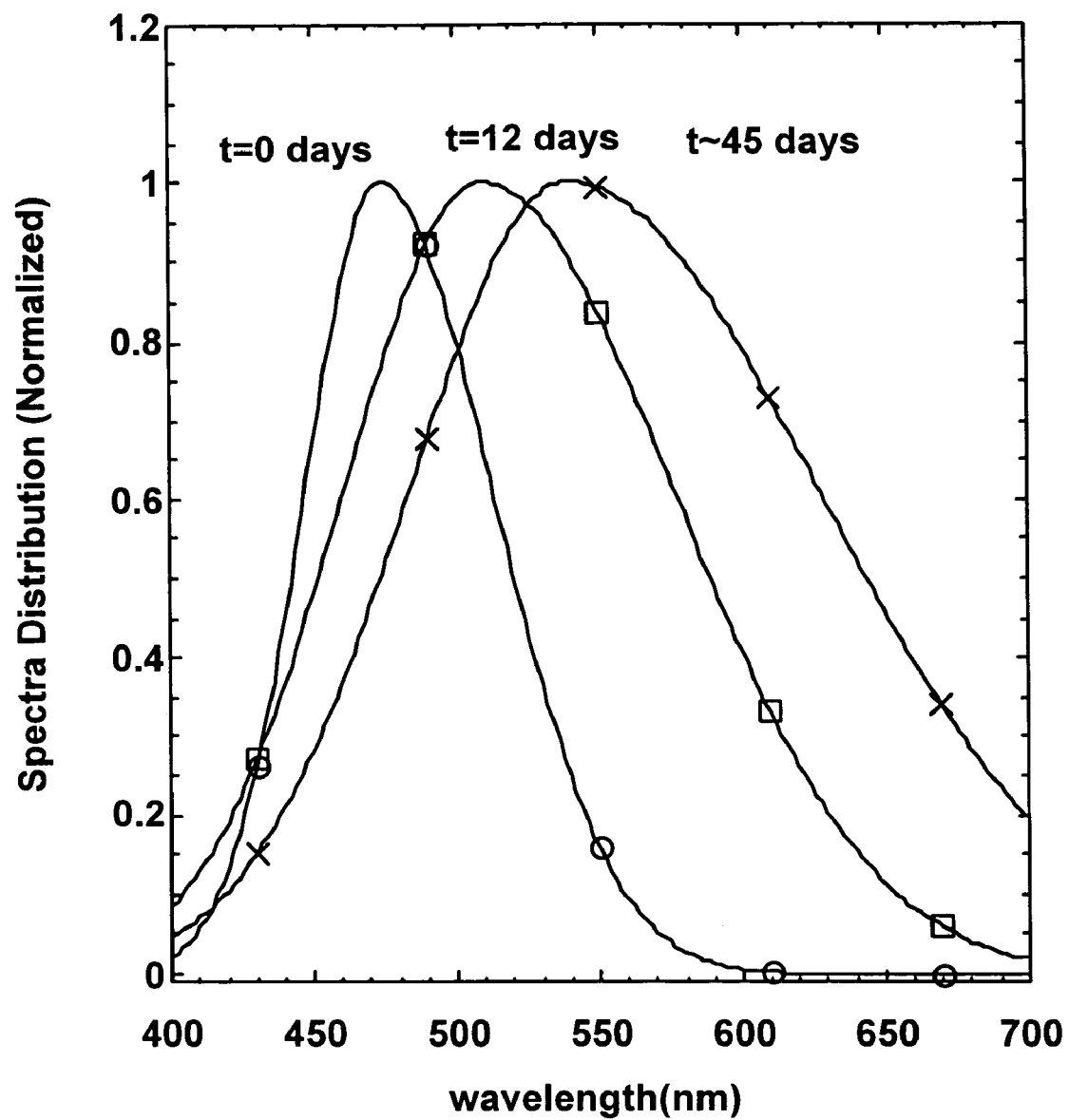
FIG. 6 illustrates the effect on the spectral energy distribution of binding of hexadecanethiol, C16SH, to 2.0-nm CdS nanocrystals in octane and annealing at T=40° C.

Another embodiment of this invention employs heating the solution to a temperature above room temperature to accelerate the aging of the light-emitting nanoparticles to more rapidly achieve good white-light emission. The temperature is selected to increase the aging rate while not causing aggregation of the nanoparticles. A temperature that is below the boiling point of the solvent and below the aggregation—inducing temperature works well. As shown in FIG. 6, addition of hexandecanethiol, C16SH, to d=2 nm CdS nanocrystals in octane shifts the peak emission energy toward longer wavelengths at a rate of approximately 3 nm/day and broadens the emission on the longer wavelength side of the peak (red-shift) by approximately 3.2 nm/day. The emission on the shorter wavelength side of the peak energy (blue-shift) broadens at a rate of approximately 1.5 nm/day. After addition of C16SH, the CdS-containing solution is placed in a heating block set to T=40° C. and the nanoclusters are allowed to undergo cluster surface restructuring. This surface restructuring is performed in a solvent. Surface restructuring does not proceed at an appreciable rate in the solid state, such as in films or when encapsulated. Furthermore, surface restructuring is performed in the presence of a stabilizing surfactant, in this example AOT at a concentration of at least 1 wt %, to prevent cluster aggregation at the elevated temperatures. A concentration of 10 wt % works well. The lower concentration is defined by the critical concentration for micelle formation. The upper concentration is defined by the critical concentration for the formation of highly viscous liquid-crystalline phases. The weakening of the local Cd-S bonds in the cluster surface by addition of hexadecanethiol accelerates the surface restructuring process. The exchange of thiol-ligated atoms between nanoparticles via diffusion and collisions of the nanoparticles occurs more rapidly at higher temperatures and in lower viscosity solvents like octane. The restructuring and PL broadening occurs over a period of approximately 45 days and results in a broad, white-emitting, transparent sample, (optical absorption onset approximately 400 to −420 nm), whose PL emission spans a range of approximately 200 nm centered at 540 nm. This compares to a surface restructuring time of approximately 270 days for the same red-shift and broadening at T=22° C.

The white-light-emitting material produced by the method of this invention can be encapsulated within a solid matrix to provide a robust structure for incorporation in light-emitting devices. In such embodiments, the solvent is evaporated from the solution of aged surface-dominated light-emitting nanoparticles to form a film containing the nanoparticles, thereby producing a white-light-emitting material. In some embodiments, the surface modifying compound is selected from a group consisting of thiols, amines, and phosphines. In some embodiments, the solvent solution comprises a solvent and a surfactant. In some embodiments, the surfactant is selected from the group consisting of AOT, quaternary ammonium salts comprising alkyl chains containing 16 or more carbon atoms, and alkylated polyethers of the formula $CH_3(CH_2)_m(CH_2CH_2O)_nOH$ where m is at least 8 and n is at least 4. In some embodiments, the solvent is selected from the group consisting of alkanes, aromatic hydrocarbons, ethers, cyclic ethers, tetrahydrofuran, and alcohols containing at least 8 carbon atoms.

One embodiment that includes an encapsulating step in the method employs an ormosil as the encapsulant. Ormosils include but are not limited to 3-aminopropyltriethoxysilane, 3-aminopropyltrimethoxysilane, [3-(2-aminoethylamino) propyl]trimethoxysilane, and 3-[2-(2-aminoethylamino) ethylamino]propyltrimethoxysilane. In one such embodiment, 1 to 4 ml of ormosil is mixed with 1 to 5 ml of an alcohol or other polar organic solvent. Water is added to a concentration of 1 to 1.5 equivalents with the oxysilane groups. Other additives may be added to either decrease or increase the density of the cured gel. Some examples of such additives include di- or tetra-methoxy, ethoxy, or hydroxy functionalized silane molecules, e.g. poly(dimethyl)siloxanes and tetra-orthosilicates. The appropriate selection depends on whether the ormosil encapsulant is to be applied as a film or as a monolith. Typical additive volumes are 5 to 20% relative to the ormosil. The solution may be used as prepared or aged at moderate temperatures for hours to months to partially hydrolyze the reactive groups. A solution containing nanoparticles is mixed with the ormosil solution. This mixture may or may not also be aged at room temperature or at moderately elevated temperatures up to typically 150° C. to facilitate interaction of the ormosil molecules with the nanoparticles. The upper limit is determined by the required optical quality of the organic glass after curing. To induce curing, the alcohol and solvent from the nanoparticle solution is removed by evaporation, which may be allowed to occur naturally, or may be thermally accelerated and/or vacuum-driven. The added nanoparticles may be white-light-emitting before encapsulation or may be induced to broad-band emission via addition to and curing in the ormosil encapsulant. Functionalities that are part of the encapsulant or encapsulant precursors can serve as the surface-modifying species. Examples of functionalities include but are not limited to amines, phosphines, and thiols. Amine- and thiol-funtionalized silicone polymers which can be subsequently cured are suitable materials for this purpose. Examples of good encapsulants include AOT, tri-octyl phosphine, an ormosil, silica glasses, silicones, and epoxies.

Figure 7:
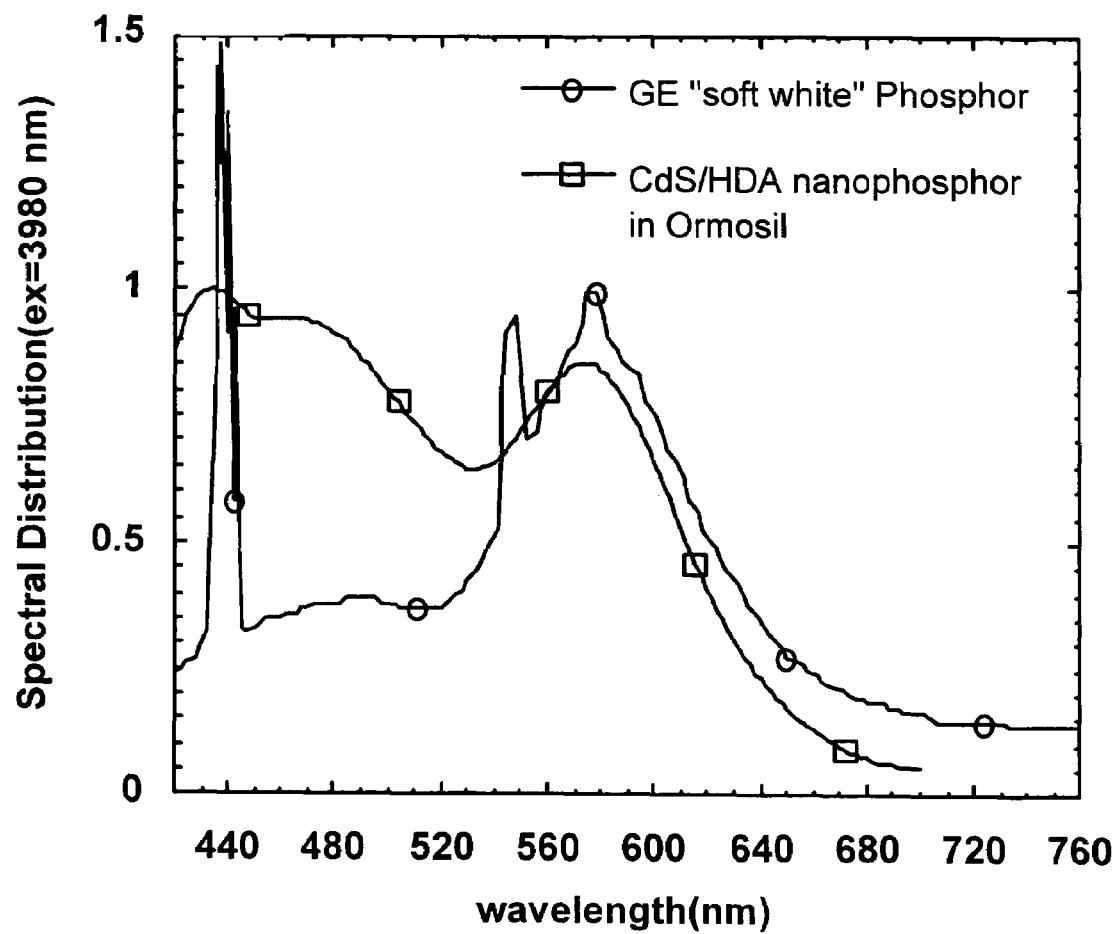
FIG. 7 illustrates the broad, white, spectral energy distribution of a transparent film containing 2-nm, hexadecylamine-modified CdS nanoparticles after curing and encapsulation in an ormosil silica glass (open squares) as compared to the emission of a GE "soft white" phosphor (open circles).

In one embodiment, a methanol solution that is 2.3 molar in 3-aminopropyltrimethoxysilane and 3.76 molar in water is prepared. The solution is aged 1 week at 55° C. To this solution is added 500 microliters of toluene that is: 0.15M in hexadecylamine-stabilized CdS nanoclusters. The solution is evaporated to a volume of approximately 1.5 milliliter using vacuum and heating at 60° C. This solution is applied to a surface and allowed to cure for 24 hours at room temperature followed by curing for 24 hours at 55° C., and finally for 24 hours at 70° C. An example of the spectral energy distribution observed by following this procedure is in FIG. 7.

Single source precursor molecules, i.e. molecules that contain both elements of a II-VI semiconductor in a single organometallic molecule, can be decomposed directly into a liquid silicone precursor. If the precursor molecules contain amine or thiol functionalities, the resultant nanoparticles can develop a broad-band emission that can be maintained through the curing process.

Figure 8:
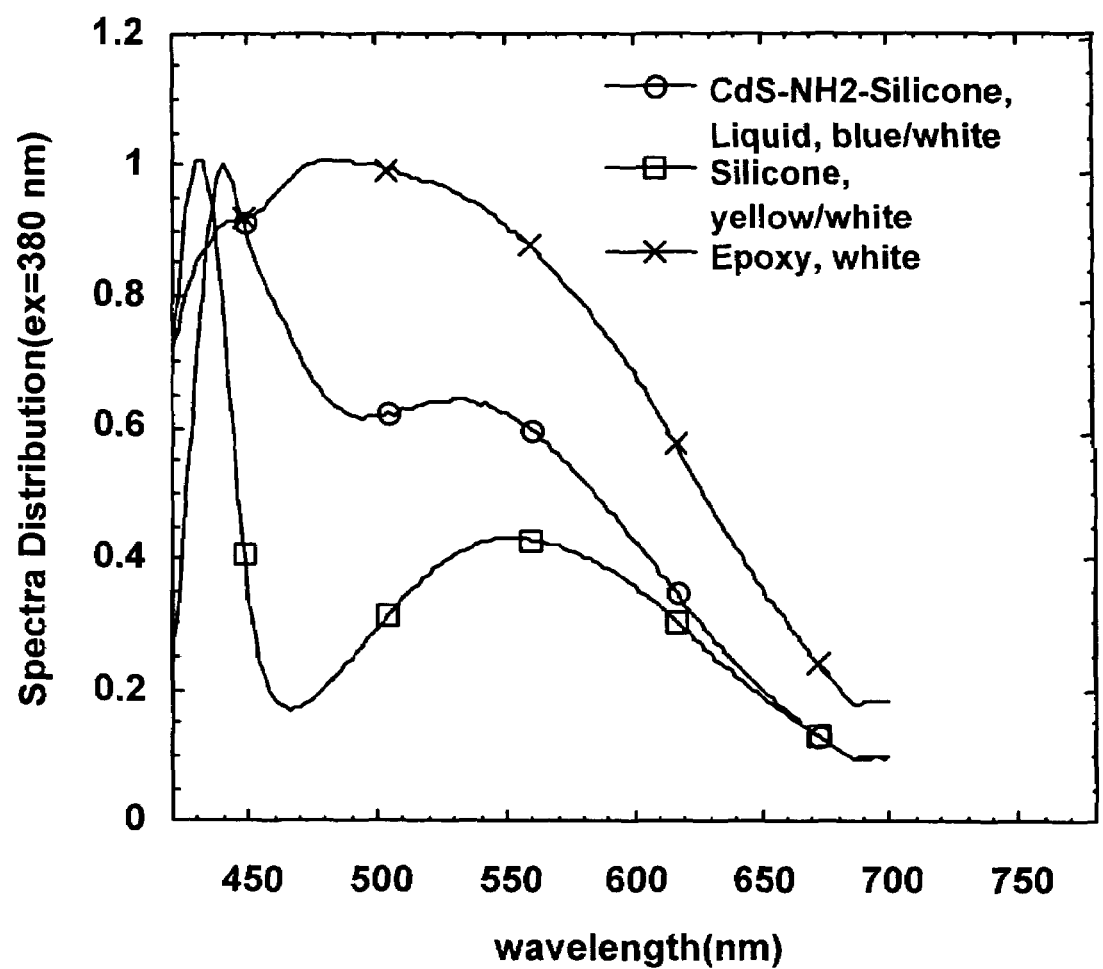
FIG. 8 illustrates the spectral distribution of light emitted from 2-nm CdS clusters stabilized with an amine-functionalized silicone polymer (Silicone-NH2), containing 7% amine moieties. The emission from the nanoparticles in the reaction solution (open circles) is compared to the emission from the nanoparticles encapsulated in silicone (open squares), and in epoxy (crosses).

In another embodiment, 1 gram of $Li_4[S_4Cd_{10}(SC_6H_5)_{16}]$ is added to 50 gram of 6 to 7 mole % (aminopropyl) methylsiloxane-dimethylsiloxane copolymer with stirring in a dry, inert atmosphere. The temperature of the mixture is raised to 100° C. and the solution is deaerated by vacuum evacuation and backfilling with dry argon three times. The temperature is then elevated to facilitate reaction to form CdS nanoparticles. The elevated temperature is typically between 100 and 250° C. In one embodiment, the temperature is raised to 200° C. at a rate of 1° C./minute and held at 200° C., with stirring for 8 hours to form CdS nanoparticles. The solution is allowed to cool and is then centrifuged to remove any residual solids. This yields a CdS-nanoparticle-containing silicone solution that can be combined with an encapsulant precursor solution and may be cured directly into a solid encapsulant, for example, a silicone or an epoxy, by methods known to those skilled in the art. An example of the broad-band photoluminescence of the post-synthesis and cured material is in FIG. 8.

Figure 9:
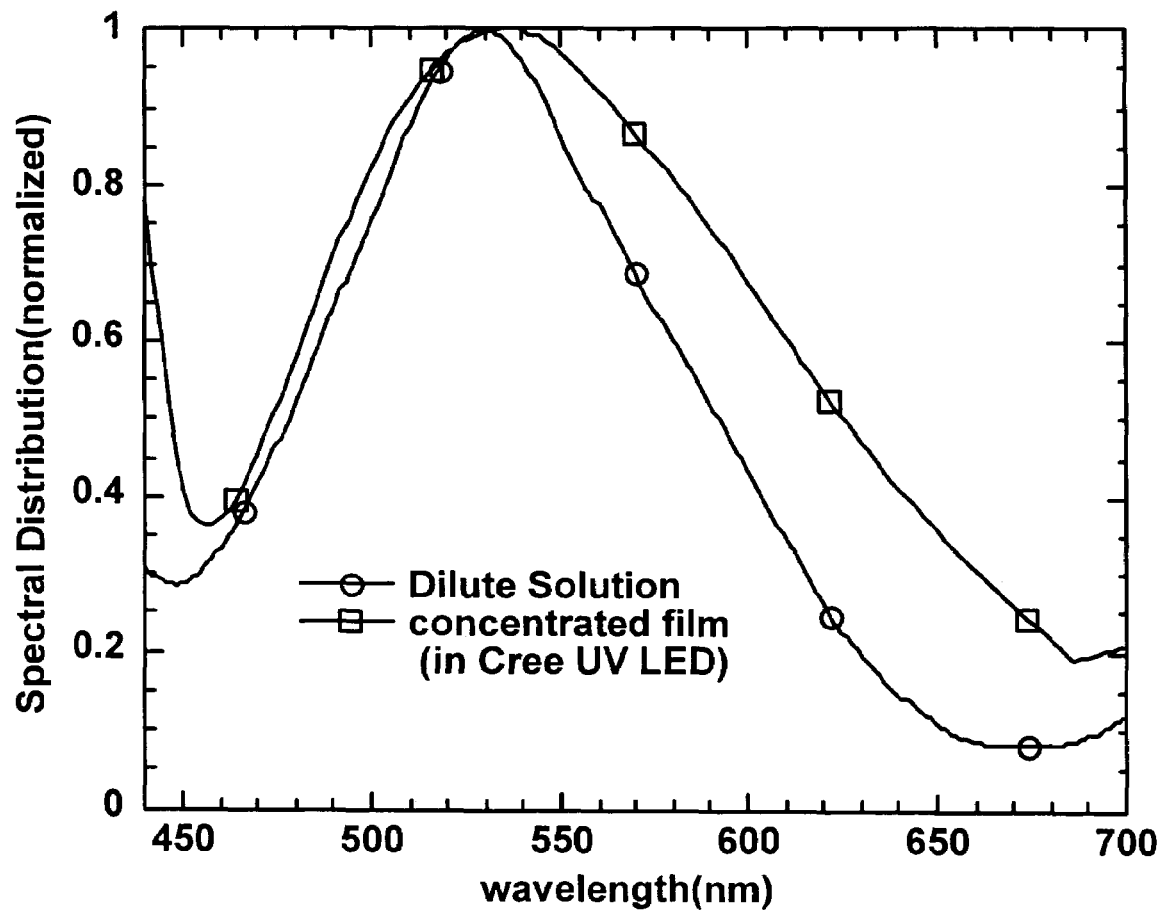
FIG. 9 illustrates the emission spectrum of a dilute solution of 2-nm alkyl-thiol-modified CdS nanoparticles stabilized by AOT and of the nanoparticles following solvent evaporation to form an AOT-based film. The normalized spectral energy distribution is shown for the white nanoparticles in dilute solution (open circles) and in an AOT-based film deposited in the fixture of a commercial UV LED, (open squares). The excitation wavelength is 400 nm.
Figure 10:
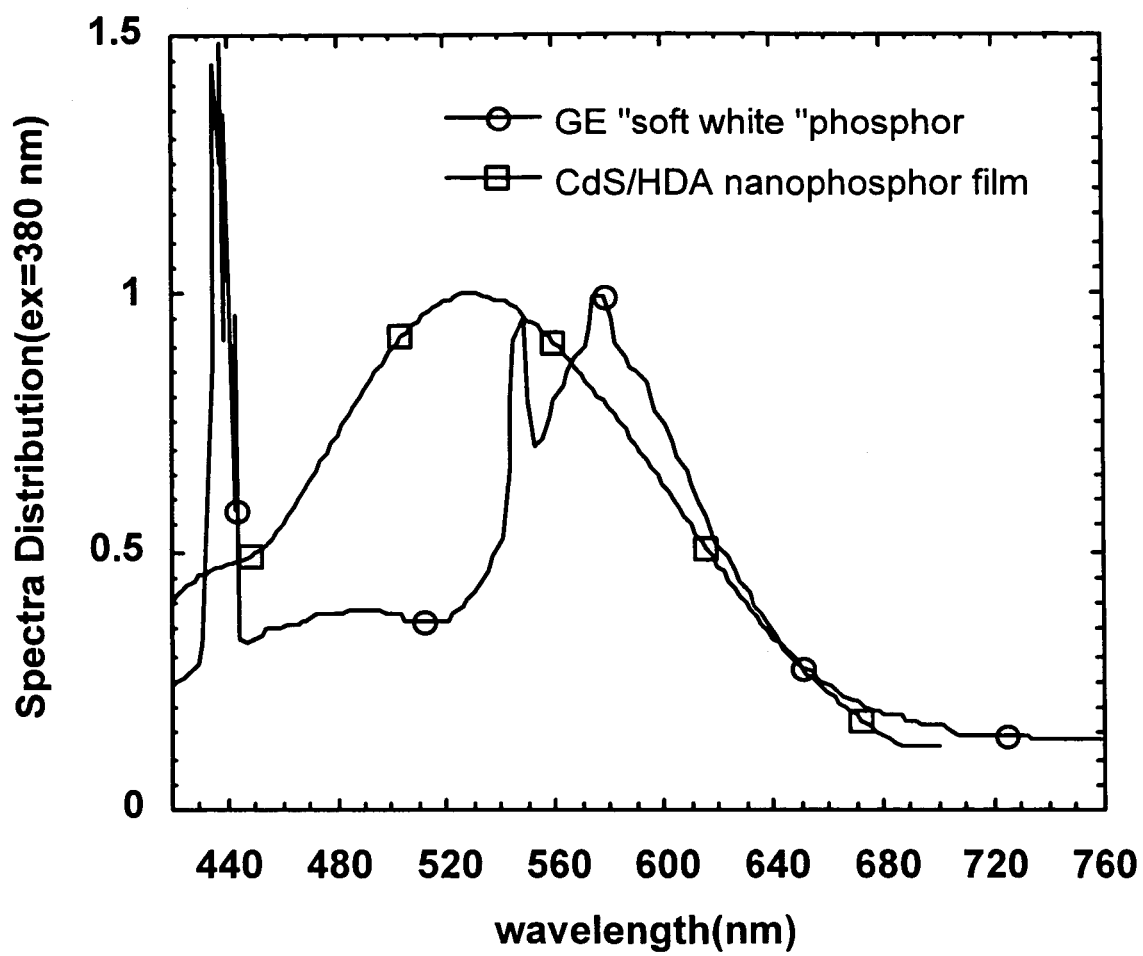
FIG. 10 illustrates the emission spectrum of a hexadecylamine-modified CdS nanoparticles stabilized by tri-octyl phosphine (TOP) following solvent evaporation to form a film. The normalized spectral energy distribution resulting from excitation at 380 nm is shown for the encapsulated nanoparticles (open squares). Emission from a GE "soft white" phosphor excited at 254 nm is also shown (open circles).

The surfactant AOT can be used to form an optically clear, gel-like film that serves as an encapsulant for the white-light-emitting nanoparticles. A volatile solution of white-light-emitting CdS/alkyl thiol nanoparticles is slowly deposited into a small cup-like container, which can be the reflector cup of an LED, forming a film whose typical spectral energy distribution is shown in FIG. 2 or 3. Hexane and octane perform well as solvents but other volatile organic solvents can also be used. Examples include aromatics like toluene or xylene. The film formation occurs slowly via evaporation of the solvent and is accompanied by further broadening or whitening of the spectral energy distribution as shown in FIG. 9

It should be apparent that there are many modifications possible with this invention, as long as the concept of reacting semiconductor nanocrystals with a surface-modifying compound to form surface-dominated light-emitting nanoparticles and aging the nanoparticles to broaden the light-emission spectrum is followed. It is intended that the scope of the invention be defined by the appended claims.

What is claimed is:

1. A method for making a white-light-emitting material, comprising:
    forming a solution of CdS nanocrystals;
    reacting a surface of said CdS nanocrystals with a surface-modifying compound to form a solution of surface-dominated light-emitting nanoparticles; aging said surface-dominated light-emitting nanoparticles to broaden a light-emission spectrum of said surface-dominated light-emitting nanoparticles to produce a white-light-emitting material, wherein said solution of CdS nanocrystals is formed by an inverse micelle method.

2. The method of claim 1, wherein a Cd salt used to form said solution of CdS nanocrystals by said inverse micelle method is selected from the group consisting of cadmium nitrate, cadmium chloride, cadmium iodide, and cadmium perchlorate.

3. The method of claim 1, wherein a sulfide source used to form said solution of CdS nanocrystals by said inverse micelle method is selected from the group consisting of ammonium sulfide, hydrogen sulfide, lithium sulfide, and sodium sulfide.

4. The method of claim 1, wherein a first solvent used to form said solution of CdS nanocrystals by said inverse micelle method is selected from the group consisting of alkanes, aromatic hydrocarbons, ethers, cyclic ethers, tetrahydrofuran, and alcohols containing at least 8 carbon atoms.

5. The method of claim 1, wherein a first surfactant used to form said solution of CdS nanocrystals by said inverse micelle method comprises an anionic surfactant.

6. The method of claim 1, wherein a first surfactant used to form said solution of CdS nanocrystals by said inverse micelle method is selected from the group consisting of AOT, quaternary ammonium salts comprising alkyl chains containing 16 or more carbon atoms, and alkylated polyethers of the formula $CH_3(CH_2)_m(CH_2CH_2O)_nOH$ where m is at least 8 and n is at least 4.

7. A method for making a white-light-emitting material, comprising:
forming a solution of CdS nanocrystals;
reacting a surface of said CdS nanocrystals with a surface-modifying compound to form a solution of surface-dominated light-emitting nanoparticles; and
aging said surface-dominated light-emitting nanoparticles to broaden a light-emission spectrum of said surface-dominated light-emitting nanoparticles to produce a white-light-emitting material, wherein the step of forming said solution of CdS nanocrystals comprises dissolving a plurality of preformed CdS nanocrystals in a solvent solution.

8. The method of claim 7, wherein said solvent solution comprises a second solvent and a second surfactant.

9. The method of claim 8, wherein said second surfactant is selected from the group consisting of AOT, quaternary ammonium salts comprising alkyl chains containing at least 16 carbon atoms, and alkylated polyethers of the formula $CH_3(CH_2)_m(CH_2CH_2O)_nOH$ where m is at least 8 and n is at least 4.

10. The method of claim 8, wherein said second solvent is selected from the group consisting of alkyl hydrocarbons, aromatic hydrocarbons, and alcohols containing 8 or more carbon atoms.

11. A method for making a white-light-emitting material, comprising:
forming a solution of CdS nanocrystals;
reacting a surface of said CdS nanocrystals with a surface-modifying compound to form a solution of surface-dominated light-emitting nanoparticles; a aging said surface-dominated light-emitting nanoparticles to broaden a light-emission spectrum of said surface-dominated light-emitting nanoparticles to produce a white-light-emitting material, and encapsulating said aged surface-dominated light-emitting nanoparticles with an encapsulant to produce a white-light-emitting material.

12. The method of claim 11, wherein said solution of CdS nanocrystals is formed by an inverse micelle method.

13. The method of claim 12, wherein a Cd salt used to form said solution of CdS nanocrystals by said inverse micelle method is selected from the group consisting of cadmium nitrate, cadmium chloride, cadmium iodide, and cadmium perchlorate.

14. The method of claim 12, wherein a sulfide source used to form said solution of CdS nanocrystals by said inverse micelle method is selected from the group consisting of ammonium sulfide, hydrogen sulfide, lithium sulfide, and sodium sulfide.

15. The method of claim 12, wherein a fourth solvent used to form said solution of CdS nanocrystals by said inverse micelle method is selected from the group consisting of alkanes, tetrahydrofuran, alcohols containing at least 8 carbon atoms, octyl ether, and benzyl ether.

16. The method of claim 12, wherein a third surfactant used to form said solution of CdS nanocrystals by said inverse micelle method comprises an anionic surfactant.

17. The method of claim 12, wherein a third surfactant used to form said solution of CdS nanocrystals by said inverse micelle method is selected from the group consisting of AOT, quaternary ammonium salts comprising alkyl chains containing at least 16 carbon atoms, and alkylated polyethers of the formula $CH_3(CH_2)_m(CH_2CH_2O)_nOH$ where m is at least 8 and n is at least 4.

18. The method of claim 11, wherein a method for forming said solution of CdS nanocrystals comprises dissolving a plurality of preformed CdS nanocrystals in a solvent solution.

19. The method of claim 18, wherein said solvent solution comprises a fifth solvent and a fourth surfactant.

20. The method of claim 19, wherein said fourth surfactant is selected from the group consisting AOT, quaternary ammonium salts comprising alkyl chains containing at least 10 carbon atoms, and alkylated polyethers of the formula $CH_3(CH_2)_m(CH_2CH_2O)_nOH$ where m is at least 8 and n is at least 4.

21. The method of claim 19, wherein said fifth solvent is selected from the group consisting of alkyl hydrocarbons containing between 5 and 16 carbon atoms, ethers, cyclic ethers, tetrahydrofuran, and alcohols containing at least 6 carbon atoms.

22. The method of claim 11, wherein said surface-modifying compound comprises an electron-donating ligand.

23. The method of claim 11, wherein said surface-modifying compound is selected from a group consisting of thiols, amines, and phosphines.

24. The method of claim 11, wherein said encapsulant is selected from the group consisting of AOT, tri-octyl phosphine, an ormosil, a silica glass, a silicone, and an epoxy.

25. A method for making a white-light-emitting material, comprising:
forming a solution of CdS nanocrystals in a solvent solution;
reacting a surface of said CdS nanocrystals with a surface-modifying compound to form a solution of surface-dominated light-emitting nanoparticles;
aging said solution of said surface-dominated light-emitting nanoparticles to broaden a light-emission spectrum of said surface-dominated light-emitting nanoparticles to form a solution of aged surface-dominated light-emitting nanoparticles:
applying said solution to a surface; and
evaporating said solvent from said solution of aged surface-dominated light-emitting nanoparticles to form a film containing said aged surface-dominated light-emitting nanoparticles to produce a white-light-emitting material.

26. The method of claim 25, wherein said surface-modifying compound is selected from a group consisting of thiols, amines, and phosphines.

27. The method of claim 25, wherein said solvent solution comprises a solvent and a surfactant.

28. The method of claim 27, wherein said surfactant is selected from the group consisting of AOT, quaternary ammonium salts comprising alkyl chains containing 16 or more carbon atoms, and alkylated polyethers of the formula $CH_3(CH_2)_m(CH_2CH_2O)_nOH$ where m is at least 8 and n is at least 4.

29. The method of claim 27, wherein said solvent is selected from the group consisting of alkanes, aromatic hydrocarbons, ethers, cyclic ethers, tetrahydrofuran, and alcohols containing at least 8 carbon atoms.

30. A method for making a white-light-emitting material comprising:
combining approximately 2 wt % $Li_4[S_4Cd_{10}(SC_6H_5)_{16}]$ with approximately 98 wt % (aminopropyl)methylsiloxane-dimethylsiloxane copolymer to form a mixture;
deaerating the mixture;
heating the mixture to an elevated temperature to form a plurality of CdS nanocrystals; and combining the mixture with an encapsulant precursor solution to form a nanoparticle-containing precursor solution.

31. The method of claim 30, wherein said elevated temperature is between 100° C. and 250° C.

32. The method of claim 30, further comprising curing the nanoparticle-containing precursor solution to form a white-light-emitting material.

* * * * *